US006035076A

United States Patent [19]

Nagase

[11] Patent Number: 6,035,076

[45] **Date of Patent: *Mar. 7, 2000**

[54] IMAGE FORMING APPARATUS

[75] Inventor: Yukio Nagase, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/466,749

[22] Filed: Jun. 6, 1995

[30] Foreign Application Priority Data

Jun. 9, 1994 [JP] Japan .................................... 6-151471

[51] Int. Cl.[7] .............................. G06K 9/32; B41J 2/385; B41J 2/435

[52] U.S. Cl. .......................... 382/294; 347/116; 347/234; 347/238

[58] Field of Search ............................ 382/294; 358/488; 347/238, 116, 234; 355/212, 207, 208, 326 R

[56] References Cited

U.S. PATENT DOCUMENTS 4,096,486 6/1978 Pfeifer et al. ........................... 347/238
5,040,003 8/1991 Willis ...................................... 347/118
5,274,394 12/1993 Corona et al. .......................... 347/237
5,303,018 4/1994 Terada et al. ....................... 355/326 R
5,394,223 2/1995 Hart et al. ............................... 355/212

*Primary Examiner*—Thomas D. Lee
*Assistant Examiner*—Wenpeng Chen
*Attorney, Agent, or Firm*—Fitzpatrick, Cella, Harper & Scinto

[57] ABSTRACT

An image forming apparatus which includes a plurality of recording units for forming images having different colors at respective recording positions on the same recording material, each of the plurality of recording units including a photosensitive member, and an exposure unit for exposing the photosensitive member with light. At least one of the plurality of recording units has an exposure unit which includes a plurality of arrays of light-emitting elements. A misregistration detector detects misregistration information for a predetermined image formed by each of the plurality of recording units, and a selector selects one of the plurality of arrays of light-emitting elements for use during image formation based on the misregistration information obtained from the misregistration detector.

8 Claims, 4 Drawing Sheets

IMAGE FORMING APPARATUS

BACKGROUND OF THE INVENTION

1. Field of the Invention

This invention relates to an image forming apparatus, such as a copier, a printer or the like, and more particularly, to a color image forming apparatus, having a plurality of recording units, for forming a color image by superposing images formed with different colors by the respective units.

2. Description of the Related Art

It has been known that in an image forming apparatus, such as a laser-beam printer, for forming an image by scanning an image bearing member with a light beam deflected by a light deflector via a condenser lens, a scanning line does not become a perfect straight line, but always curves.

Accordingly, in a color image forming apparatus using such a laser scanning device, by performing scanning for respective colors using the same optical scanning device (for example, by performing four scanning operations), the same optical scanning characteristics are provided for respective colors, and occurrence of color misregistration is prevented by superposing images having the same distorsion characteristics.

The above-described approach, however, has the problem that in order to obtain a color image, much time is required for outputting images because a plurality of scanning operations must be performed using the same optical scanning device.

In order to solve such a problem, apparatuses for outputting a color image at a high speed by providing a plurality of recording units and providing an optical scanning device for each of the units have been developed.

However, in a method in which an optical scanning device is provided for each of a plurality of recording units, image recording is performed for each color, and images of respective colors are sequentially subjected to multiplex transfer, there is a large possibility of occurrence of color misregistration because respective optical scanning devices have different distortion characteristics.

In order to solve such a problem, there has been found a possibility of not producing optical scanning distortion and therefore preventing occurrence of color misregistration in the plurality of recording units by using solid-state optical scanning devices, each comprising a set of fine recording elements as an optical scanning device, instead of light deflectors.

In such solid-state optical scanning devices, however, since fine recording elements are arranged in a line with an interval corresponding to the recording density, the centers of recording pixels must coincide with one another among the plurality of recording units although optical scanning distortion is not produced.

For that purpose, it is necessary to perform precise position adjustment when assembling respective solid-state optical scanning devices, and to perform temperature control of the entire optical system in order to prevent movement of the center of the recording pixel of each device due to thermal expansion of optical members caused by temperature changes, thereby causing a large increase in the cost of the apparatus.

SUMMARY OF THE INVENTION

The present invention has been made in consideration of the above-described problems.

It is an object of the present invention to provide an inexpensive color image forming apparatus in which it is unnecessary to perform precise position adjustment and temperature control of optical scanning devices.

According to one aspect, the present invention, which achieves the above-described object, relates to an image forming apparatus comprising a plurality of recording units for forming images having different colors at respective recording positions on the same recording material. Each of the plurality of recording units comprises a photosensitive member, and exposure means for exposing the photosensitive member with light in accordance with image information. At least one of the plurality of exposure means comprises a plurality of arrays of light-emitting elements. The apparatus further comprises misregistration detection means for detecting misregistration of a predetermined image formed by each of the recording units, and selection means for selecting one of the plurality of light-emitting-element arrays for the use during image formation based on misregistration information obtained from the misregistration detection means.

The foregoing and other objects, advantages and features of the present invention will become more apparent from the following detailed description of the preferred embodiment taken in conjuction with the accompanying drawings.

DETAILED DESCRIPTION OF THE PREFERRED EMBODIMENT

A description will now be provided of a preferred embodiment of the present invention with reference to the drawings.

Figure 2:
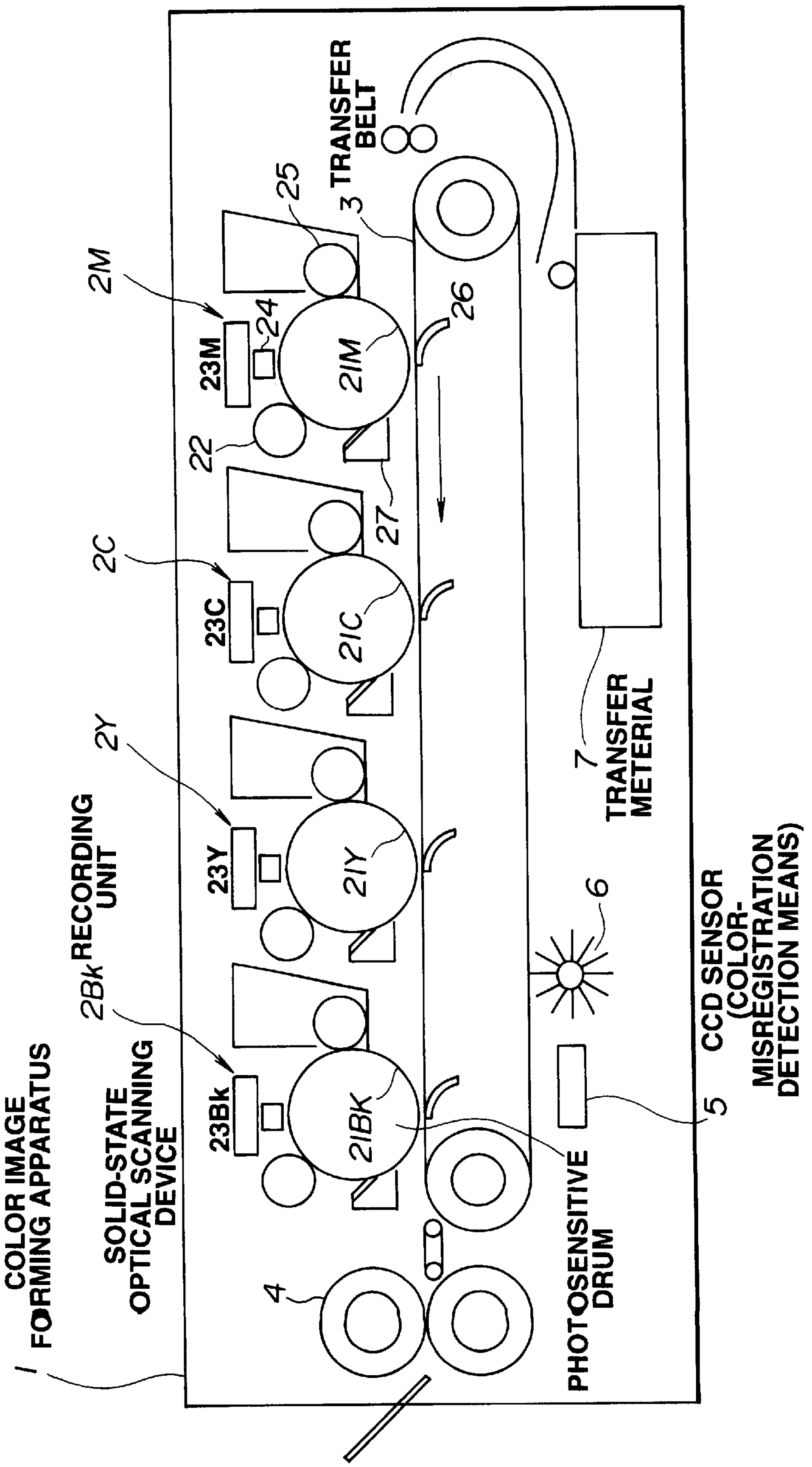
FIG. 2 is a schematic diagram illustrating the configuration of the color image forming apparatus of the embodiment.

FIG. 2 is a schematic cross-sectional view illustrating the configuration of a color image forming apparatus according to the embodiment.

In FIG. 2, a color image forming apparatus 1 comprises a plurality of recording units 2M, 2C, 2Y and 2Bk for forming magenta, cyan, yellow and black images, respectively.

A recording unit for each color comprises a photosensitive drum, such as photosensitive drum 21, serving as an image bearing member, and a process element surrounding it, comprising a charging device, such as charging device 22, exposure means (such as solid-state optical scanning device 23M and a SELFOC® (a registered trade mark) optical system 24), a developing device such as developing device 25, a transfer device such as transfer device 26, and a cleaning device such as cleaning device 27.

The recording process comprises an ordinary electrophotographic process. Although a detailed description will be omitted, the configuration of the process element is not limited to that shown in FIG. 2. For example, the charging device 22 does not always adopt a contact-roller charging method as shown in FIG. 2. Instead, a brush charging method, a corona charging method or the like may also be used. The developing device 25 uses a one-component or two-component developer, and development is performed either in a state in which the developing device 25 contacts the photosensitive drum 21M, or in a state in which the developing device 25 does not contact the photosensitive drum 21M.

Images of respective colors formed on the photosensitive drums 21M, 21C, 21Y and 21Bk at the recording units 2M, 2C, 2Y and 2Bk, respectively, are subjected to multiplex transfer onto a recording material 7 conveyed by a transfer belt (conveying belt) 3. A color image is formed by passing the recording material 7 through a fixing device 4.

Figure 3A:
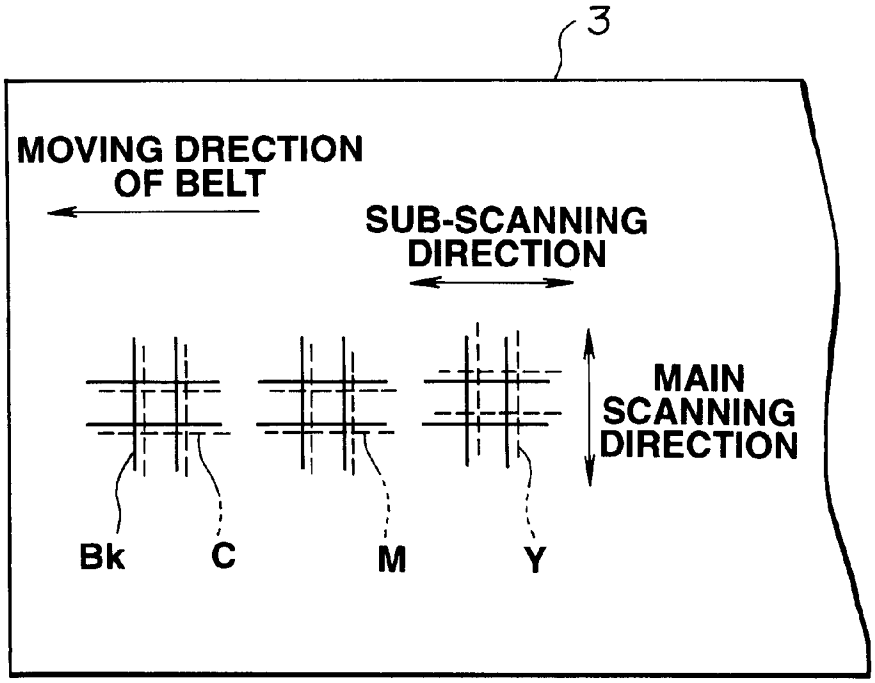
FIGS. 3(*a*) and 3(*b*) are a planar view and a perspective view, respectively, illustrating occurrence and detection of color misregistration in the embodiment.
Figure 3B:
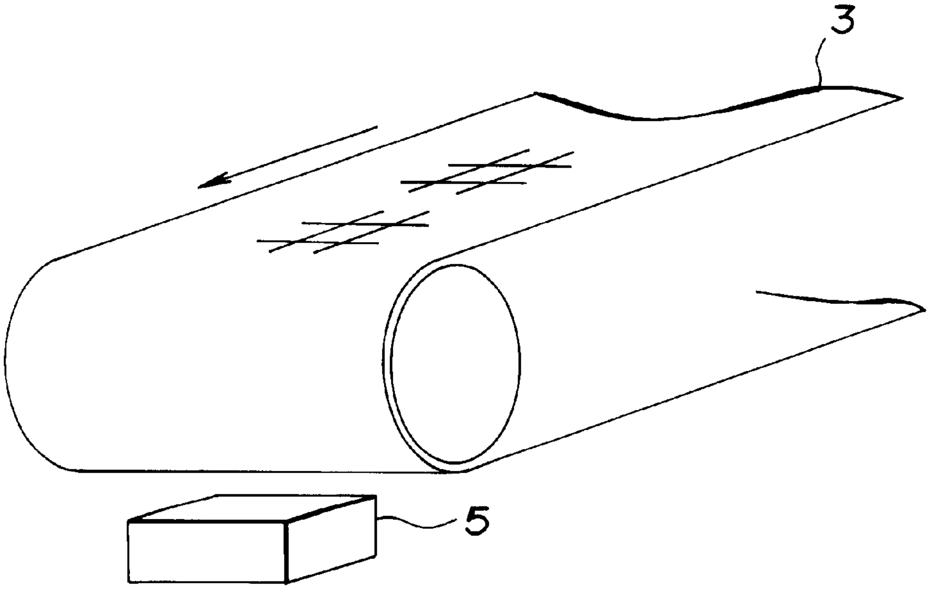

In the above-described color image forming apparatus, however, when performing multiplex transfer of the images of the respective colors recorded on photosensitive drums 21M through 21Bk onto the transfer material 7, color misregistration may occur between the images of the respective colors, as shown in FIG. 3(*a*).

FIG. 3(*a*) illustrates a case in which a pattern (a predetermined image) for detecting color misregistration of each color is subjected to multiplex transfer onto the transfer belt 3 by being superposed on a reference Bk image. Various reasons may be considered for the occurrence of such color misregistration. Color misregistration will occur, for example, when the center distances between the recording units 2M, 2C, 2Y and 2Bk differ from the center distances between the photosensitive drums 21M, 21C, 21Y and 21Bk due to a temperature change, or when the reference position of the optical system moves.

Accordingly, there is a limitation in trying to solve all factors of the occurrence of the above-described color misregistration, for example, by performing precise temperature control. Hence, it is important to provide means for correcting color mistregistration which has occurred.

A description will now be provided of a method for correcting color misregistration according to the present invention.

Although as described above, various reasons may be considered for the occurrence of color misregistration, color misregistration which will occur can be classified, as shown in FIG. 3(*a*), into two kinds, i.e., color misregistration in the main scanning direction as seen from the solid-state optical scanning devices (light-emitting-element arrays) 23M, 23C, 23Y and 23Bk (the direction of arrangement of pixels of each of the optical scanning devices), and color misregistration in the sub-scanning direction (the moving direction of the photosensitive drums 21M, 21C, 21Y and 21Bk and the recording material 7).

First, a description will be provided of a method for correcting color misregistration in the main scanning direction, which is the point of the present invention.

As shown in FIG. 3(*a*), detection of color misregistration is performed by performing multiplex transfer of a pattern for detecting color misregistration onto the transfer belt 3 by being superposed on a reference Bk image, reading the formed pattern for each color by a CCD (charge-coupled device) sensor 5, serving as color-misregistration detection means (see FIG. 3(*b*)), and detecting the amount of relative misregisration of each color pattern.

In conventional solid-state optical scanning devices, there is a limitation in correction of color misregistration, particularly in the main scanning direction, detected by the CCD sensor 5.

Figure 4:
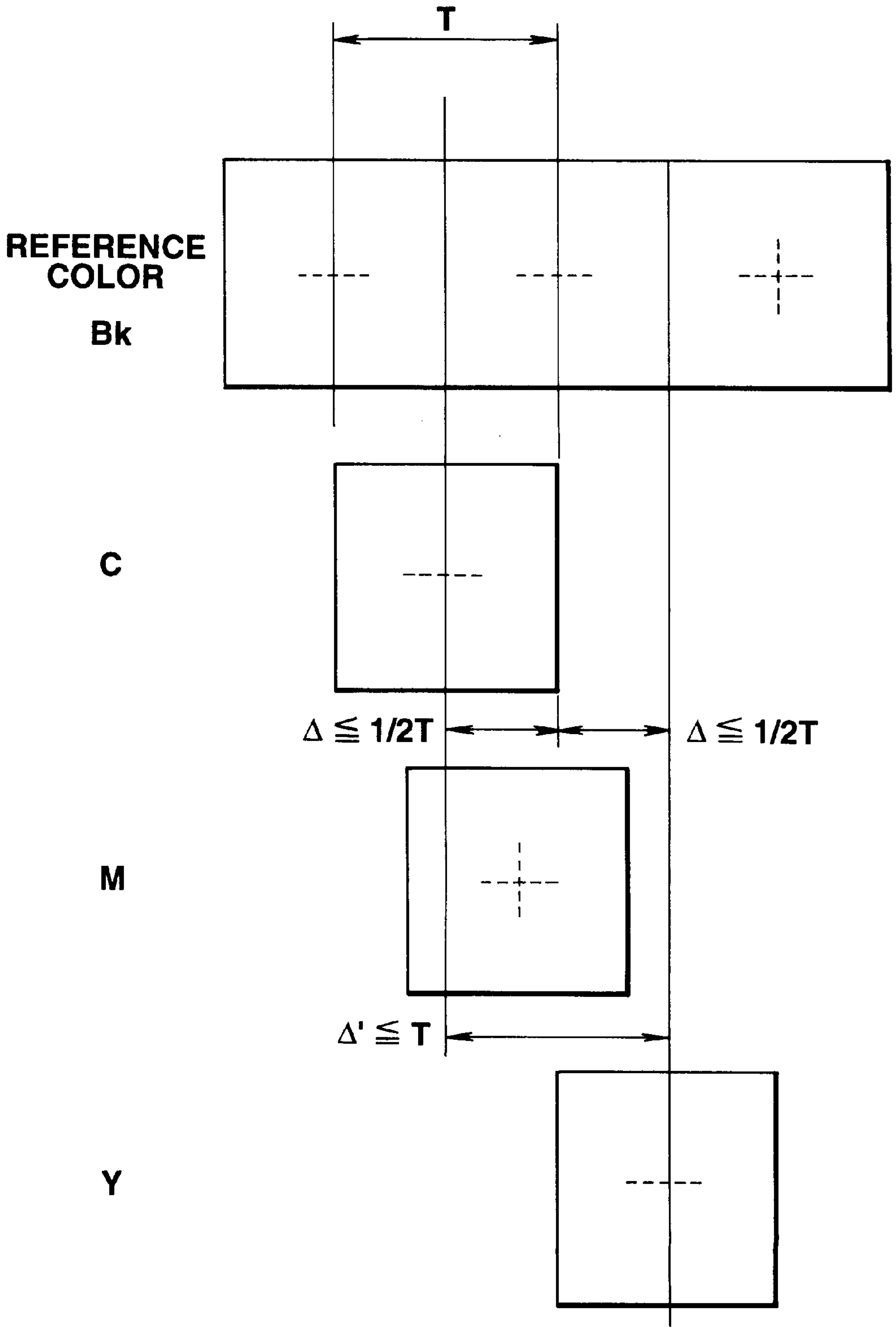
FIG. 4 is a diagram illustrating correction of color misregistration in the embodiment.

In a solid-state optical scanning device (an LED (light-emitting diode) array), such as solid state optical scanning device 23M fine recording elements (light-emitting elements) are arranged in a line with an interval corresponding to the recording density. Hence, it is necessary to arrange the fine recording elements such that the centers of the recording pixels coincide with one another in the plurality of recording units 2M, 2C, 2Y and 2Bk. When a deviation has been detected between the centers of the recording pixels in some of the recording units 2M, 2C, 2Y and 2Bk, if the amount of the deviation is equal to or more than an interval corresponding to the recording density, the amount of color misregistration can be reduced by moving image data transferred to the solid-state optical scanning device by the number of pixels corresponding to the amount of the deviation. However, since as shown in FIG. 4, the amount of correction is limited to a distance which equals an integer multiple of a pixel interval T, it is impossible to perform correction of a deviation which is less than the pixel interval. After correction, an amount of color misregistration having a value of $\Delta \leqq \frac{1}{2} \cdot T$ relative to the reference color, and a value of $\Delta' \leqq T$ relative to other colors than the reference color. Hence, it is impossible to perform very precise correction.

Figure 1:
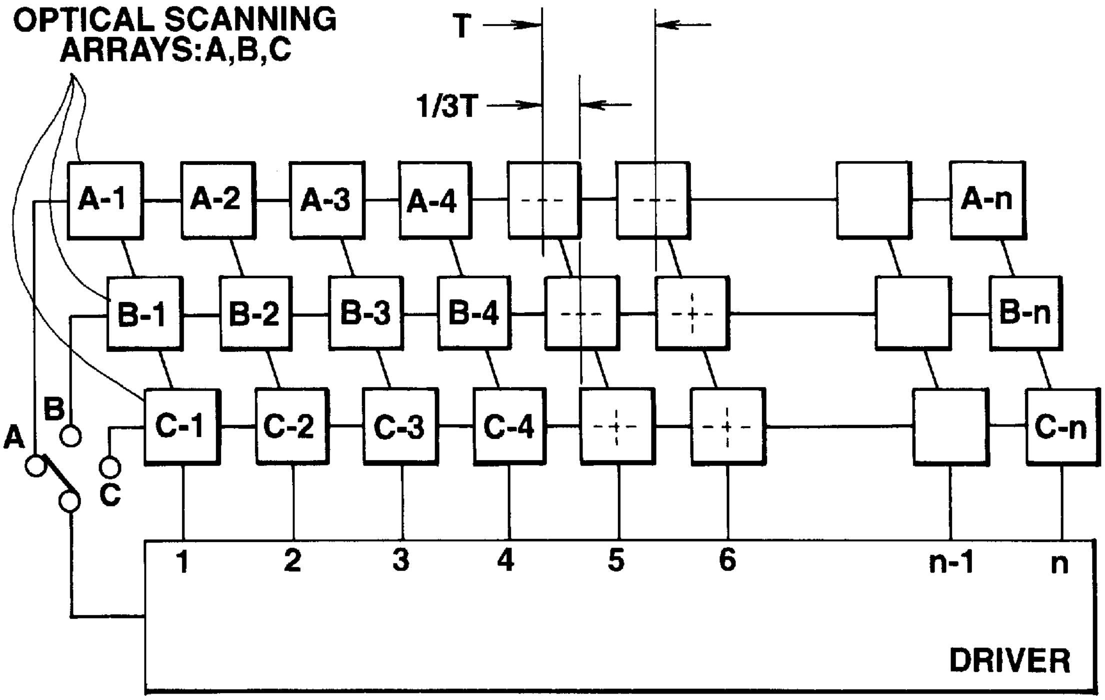
FIG. 1 is a block diagram illustrating a solid-state optical scanning device applied to a color image forming apparatus according to an embodiment of the present invention.

In the present embodiment, as shown in FIG. 1, each of solid-state optical scanning devices 23M, 23C, 23Y and 23Bk has a plurality of optical scanning arrays (three arrays A, B and C in the present embodiment), arranged such that the centers of the recording pixels of the optical scanning arrays differ from one another (i.e., the plurality of arrays shift from one another in the direction of arrangement of elements), so that an optimum optical scanning array is selected so as to provide a minimum amount of position deviation based on recording-position correction information of each of the recording units 2M, 2C, 2Y and 2Bk.

A description will now be provided of the abovedescribed recording-position correction information. That is, color misregistration of each image transferred onto the transfer belt 3 (or the recording material 7 may, of course, be adopted) is detected by the CCD sensor 5 in advance, recording-position correction information based on the color misregistration is transmitted to the recording units 2M, 2C, 2Y and 2Bk, and an optimum array to be used during image formation is selected from among the plurality of optical scanning arrays by selection means, such as a CPU (central processing unit) or the like (not shown). The image formation indicates actual formation of a color image in accordance with the image information on the recording material. Detection of color misregisration by the CCD sensor 5 may be performed every time each of the recording units 2M, 2C, 2Y and 2Bk operates, or for every predetermined number of recording operations (recorded sheets), or for every predetermined time period. The detected color misregistration may be corrected at every detection, or for every predetermined number of recording operations (recorded sheets), or for every predetermined time period.

In the embodiment shown in FIG. 1, three rows of optical scanning arrays A, B and C are provided. In this configuration, the centers of the pixels of adjacent arrays from among the optical scanning arrays A, B and C are shifted from each other by $\frac{1}{3} \cdot T$, where T represents the interval between adjacent pixels. Accordingly, if correction of color misregistration is performed using those solid-state optical scanning devices 23M, 23C, 23Y and 23Bk, accuracy of $\frac{1}{3} \cdot T$ can be obtained for the amount of correction, so that color misregistration can be suppressed to a value of $\Delta \leqq \frac{1}{6} \cdot T$ for a reference color, and to a value of $\Delta' \leqq \frac{1}{3} \cdot T$ for other color than the reference color. Hence, very precise correction, which has been impossible in conventional apparatuses, can be performed. Although in the present embodiment, the amount of shift of the centers of the pixels of adjacent arrays from among the optical scanning arrays A, B and C is made to be ⅓·T, any value less than the size of one pixel is effective for correction of color misregistration.

In the present invention, although accuracy in correction of color misregistration is much improved as the number of optical scanning arrays in a single solid-state optical scanning device increases, the configuration of the solid-state optical scanning device becomes more complicated. Accordingly, about 2–4 optical scanning arrays are considered to be suitable in consideration of balance between accuracy in correction and the cost of the apparatus. Although in the present embodiment, each of four solid-state optical scanning device 23M, 23C, 23Y and 23Bk has a plurality of light-emitting-element arrays, at least one of a plurality of exposure means may have a plurality of light-emitting-element arrays.

A method for correcting color misregistration in the main scanning direction has now been described.

Next, a description will be provided of a method for correcting color misregistration in the sub-scanning direction.

A method for correcting color misregistration in the sub-scanning direction shown in FIG. 3(*a*) is applied to the solid-state optical scanning devices 23M, 23C, 23Y and 23Bk of the present invention as well as to conventional solid-state optical scanning devices.

Color misregistration in the sub-scanning direction detected by the CCD sensor 5 can be corrected by shifting the driving timing of a solid-state optical scanning device, such as solid-state optical scanning device 23M by a time t corresponding to the amount of position deviation calculated from the moving speed of a photosensitive drum, such as photosensitive drum 21M.

As described above, according to the present invention, color misregistration in the main scanning direction is corrected by selecting a plurality of optical scanning arrays and moving image data to be transferred by the number of pixels corresponding to the amount of position deviation, and color misregistration in the sub-scanning direction is corrected by shifting the driving timing of the optical scanning device.

In the present invention, light deflectors are not used as optical scanning devices. Instead, any solid-state optical scanning devices, each comprising a set of fine optical recording elements arranged in a line at an interval corresponding to the recording density, may be used.

For example, a self-light-emitting device, such as an LED array, an LD (laser-diode) array, an EL (electroluminescent) element, a plasma light-emitting device, a fluorescent light-emitting tube or the like, or a light-deflecting device, such as a liquid-crystal shutter array, a microdeflecting mirror element or the like, may be used as the solid-state optical scanning device.

From among the above-described devices, it can be considered that the liquid-crystal shutter array is the solidstate optical scanning device which is most suitable for executing the present invention, because the solid-state optical scanning devices 23M, 23C, 23Y and 23Bk of the present invention can be easily manufactured only by forming an electrode pattern corresponding to a plurality of optical scanning arrays.

According to the present invention having the above-described configuration and functions, color-misregistration detection means for detecting color misregistration in a color image is provided, each solid-state optical scanning device has a plurality of optical scanning arrays arranged such that the central positions of the recording elements of the optical scanning arrays differ from one another, and an optimum optical scanning array is selected based on the amount of color misregistration obtained from the color-misregistration detection means. Hence, an optical scanning array providing a minimum amount of color misregistration is selected from among the plurality of optical scanning arrays, and therefore the quality of the obtained image is remarkably improved. Furthermore, it is possible to provide an inexpensive color image forming apparatus which does not require a complicated structure, precise optical arrangement, temperature control and the like, and which provides a color image having very little color misregistration.

The individual components shown in outline in the drawings are all well known in the image forming apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:

a plurality of recording units for forming images having different colors on a same recording material, each of said plurality of recording units comprising an exposure means for exposing a photosensitive member with light in accordance with image information, at least one of said plurality of recording units having an exposure means comprising a plurality of arrays of light-emitting elements, wherein each of said plurality of arrays can expose an image onto substantially an entire surface of the photosensitive member;

misregistration detection means for detecting misregistration based on a predetermined image formed by each of said plurality of recording units; and selection means for selecting one of said plurality of arrays of light-emitting elements for use during image formation of a color image on the recording material based on the misregistration information obtained from said misregistration detection means, wherein the arrays other than selected array are not used during the image formation on the recording material.

2. An apparatus according to claim 1, wherein a direction of arrangement of elements in said plurality of arrays of light-emitting elements is substantially parallel to a longitudinal direction of a photosensitive member for the at least one of said plurality of recording units.

3. An apparatus according to claim 1, wherein said plurality of arrays of light-emitting elements are arranged in a direction perpendicular to that of elements in said plurality of arrays of light-emitting elements.

4. An apparatus according to claim 3, wherein said plurality of arrays of light-emitting elements are shifted from one another in a direction of arrangement of the elements in the plurality of arrays of light-emitting elements.

5. An apparatus according to claim 4, wherein an amount of shift among said plurality of arrays of light-emitting elements is less than one pixel.

6. An apparatus according to claim 1, wherein said light-emitting elements comprise LED's (light-emitting diodes).

7. An apparatus according to claim 1, further comprising a conveying belt for sequentially conveying the same recording material to a plurality of recording positions, wherein said plurality of recording units form predetermined images on said conveying belt.

8. An apparatus according to claim 1, wherein said plurality of recording units form predetermined images on the same recording material.

* * * * *